(12) United States Patent
Wilenski et al.

(10) Patent No.: US 10,457,138 B2
(45) Date of Patent: Oct. 29, 2019

(54) SELF-SEALING LIQUID BLADDERS

(71) Applicant: The Boeing Company, Chicago, IL (US)

(72) Inventors: Mark S. Wilenski, Mercer Island, WA (US); Michael P. Kozar, Mercer Island, WA (US); Amy E. Bahe, Seattle, WA (US)

(73) Assignee: The Boeing Company, Chicago, IL (US)

( * ) Notice: Subject to any disclaimer, the term of this patent is extended or adjusted under 35 U.S.C. 154(b) by 196 days.

(21) Appl. No.: 14/843,541

(22) Filed: Sep. 2, 2015

(65) Prior Publication Data

US 2017/0057341 A1   Mar. 2, 2017

(51) Int. Cl.
*B60K 15/03* (2006.01)

(52) U.S. Cl.
CPC ........... *B60K 15/03177* (2013.01); *B60K 2015/03447* (2013.01)

(58) Field of Classification Search
CPC .. B65D 2590/245; B65D 90/22; B65D 90/24; B60K 15/03177; B60K 2015/03407; B60K 2015/03309
USPC ..... 220/990, 560.01–560.03, 900, 562, 4.14, 220/4.12; 428/912; 89/914
See application file for complete search history.

(56) References Cited

U.S. PATENT DOCUMENTS

| | | |
|---|---|---|
| 1,386,791 A | 8/1921 | Murdock |
| 1,406,667 A | 2/1922 | Macbeth |
| 1,463,498 A | 7/1923 | Burgess |
| 2,406,679 A | 8/1946 | Gray et al. |
| 2,416,231 A | 2/1947 | Smith et al. |
| 2,421,613 A * | 6/1947 | De Weese ............. B64D 37/06 220/62.21 |
| 2,422,797 A | 6/1947 | Pfleumer |
| 2,425,514 A | 8/1947 | Dasher et al. |
| 2,438,965 A | 6/1948 | Dasher |
| 2,626,882 A | 1/1953 | Gerke |
| 2,715,085 A | 8/1955 | Boger |
| 3,379,336 A | 4/1968 | Stedfeld |
| 3,431,818 A | 3/1969 | King |
| 3,509,016 A | 4/1970 | Wickersham et al. |
| 3,563,846 A | 2/1971 | Harr |
| 3,654,057 A | 4/1972 | Olevitch |
| 3,664,904 A * | 5/1972 | Cook .................... B64D 37/06 220/560.02 |
| 3,698,587 A | 10/1972 | Baker et al. |
| 3,801,425 A | 4/1974 | Cook |
| 3,949,894 A | 4/1976 | Underwood |
| 3,980,106 A | 9/1976 | Wiggins |

(Continued)

*Primary Examiner* — Jes F Pascua
*Assistant Examiner* — Nina K Attel
(74) *Attorney, Agent, or Firm* — McDonnell Boehnen Hulbert & Berghoff LLP

(57) ABSTRACT

A self-sealing liquid bladder having a plurality of layers including a liquid impermeable material layer that is compatible with a liquid held in the bladder and at least one sealing layer that is conformally arranged to span a surface area of the liquid impermeable material layer and that is separated from a liquid held in the bladder by the liquid impermeable layer, the sealing layer including a sealing means that, in response to a penetration of both the liquid impermeable material layer and the sealing layer, substantially seals the penetration.

15 Claims, 6 Drawing Sheets

(56) References Cited

U.S. PATENT DOCUMENTS

| | | | |
|---|---|---|---|
| 4,088,240 A * | 5/1978 | San Miguel | B60K 15/03177 220/560.02 |
| 4,115,616 A | 9/1978 | Heitz et al. | |
| 4,336,291 A | 6/1982 | Broadhurst et al. | |
| 4,422,561 A | 12/1983 | Grosvenor et al. | |
| 4,925,057 A | 5/1990 | Childress et al. | |
| 5,383,567 A | 1/1995 | Sorathia et al. | |
| 5,628,425 A * | 5/1997 | Sharp | B29C 53/8075 220/560.03 |
| 7,381,287 B2 | 6/2008 | Monk et al. | |
| 7,393,572 B1 | 7/2008 | Monk et al. | |
| 7,794,808 B2 | 9/2010 | Dudt et al. | |
| 7,861,844 B2 | 1/2011 | Hayduchok et al. | |
| 7,900,333 B2 | 3/2011 | Tweet et al. | |
| 8,043,676 B2 | 10/2011 | Ohnstad et al. | |
| 8,685,513 B1 * | 4/2014 | Dry | B32B 15/085 152/503 |
| 8,777,158 B2 | 7/2014 | Erickson | |
| 8,985,380 B2 | 3/2015 | Cook | |
| 2004/0065456 A1 | 4/2004 | Belli et al. | |
| 2007/0009694 A1 * | 1/2007 | Monk | B60K 15/03177 428/35.7 |
| 2008/0264951 A1 | 10/2008 | Tweet et al. | |
| 2010/0187236 A1 * | 7/2010 | Le Rossignol | B32B 25/10 220/560.02 |
| 2011/0186580 A1 | 8/2011 | Joh et al. | |
| 2011/0253726 A1 | 10/2011 | Monk et al. | |
| 2012/0055937 A1 | 3/2012 | Monk et al. | |
| 2012/0058348 A1 | 3/2012 | Monk et al. | |
| 2012/0058700 A1 | 3/2012 | Ohnstad et al. | |
| 2013/0140046 A1 | 6/2013 | Monk et al. | |
| 2013/0256315 A1 * | 10/2013 | Bongiovanni | B65D 90/22 220/560.01 |
| 2013/0306306 A1 * | 11/2013 | Korte | A61L 24/043 166/179 |
| 2015/0291332 A1 * | 10/2015 | Misciagna | B60K 15/03177 220/560.03 |
| 2016/0347038 A1 | 12/2016 | Childress et al. | |
| 2017/0057342 A1 | 3/2017 | Kozar et al. | |
| 2017/0057343 A1 | 3/2017 | Kozar et al. | |
| 2017/0057344 A1 | 3/2017 | Kozar et al. | |
| 2017/0057345 A1 | 3/2017 | Wilenski et al. | |

\* cited by examiner

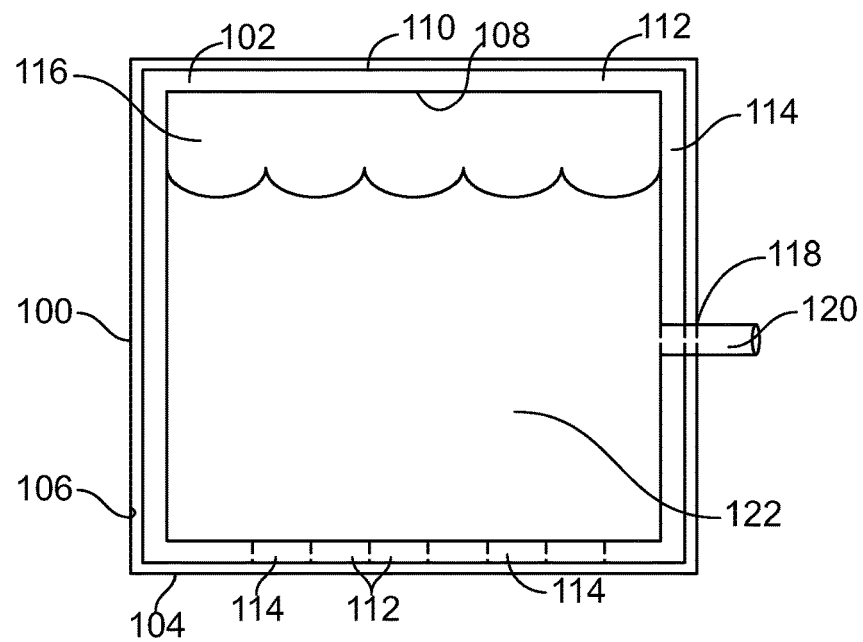
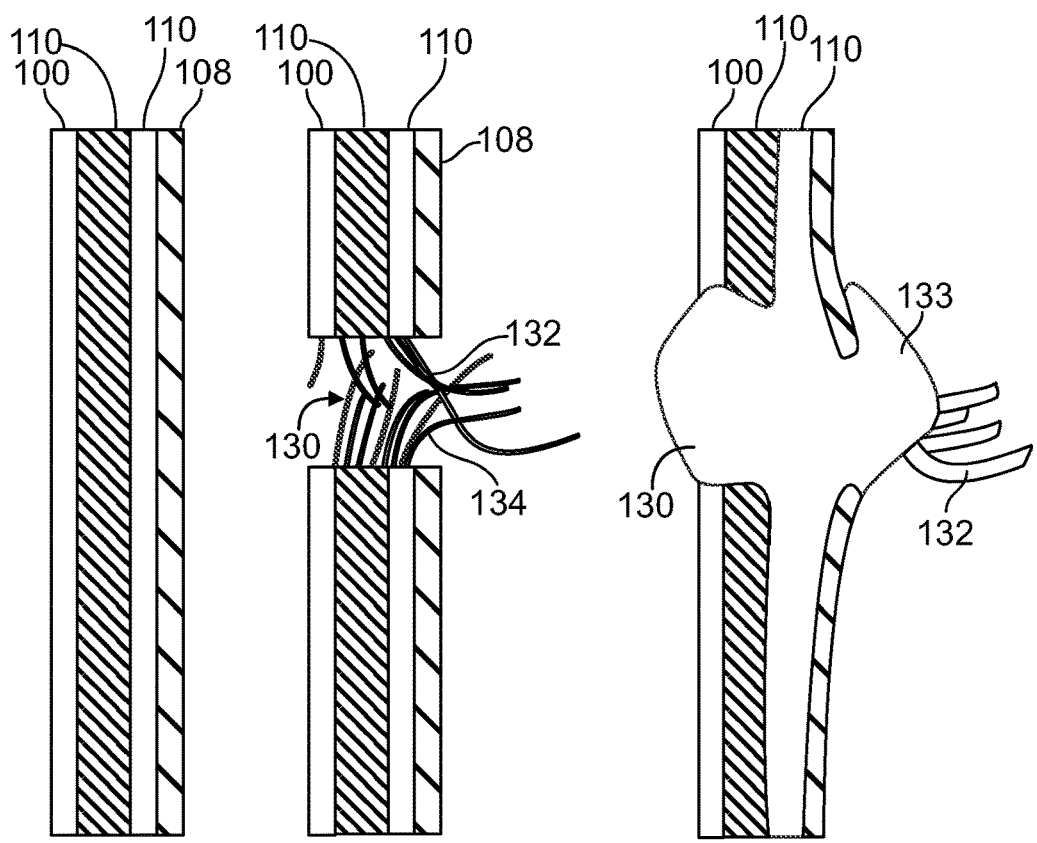
FIG. 1
FIG. 2A  FIG. 2B  FIG. 2C

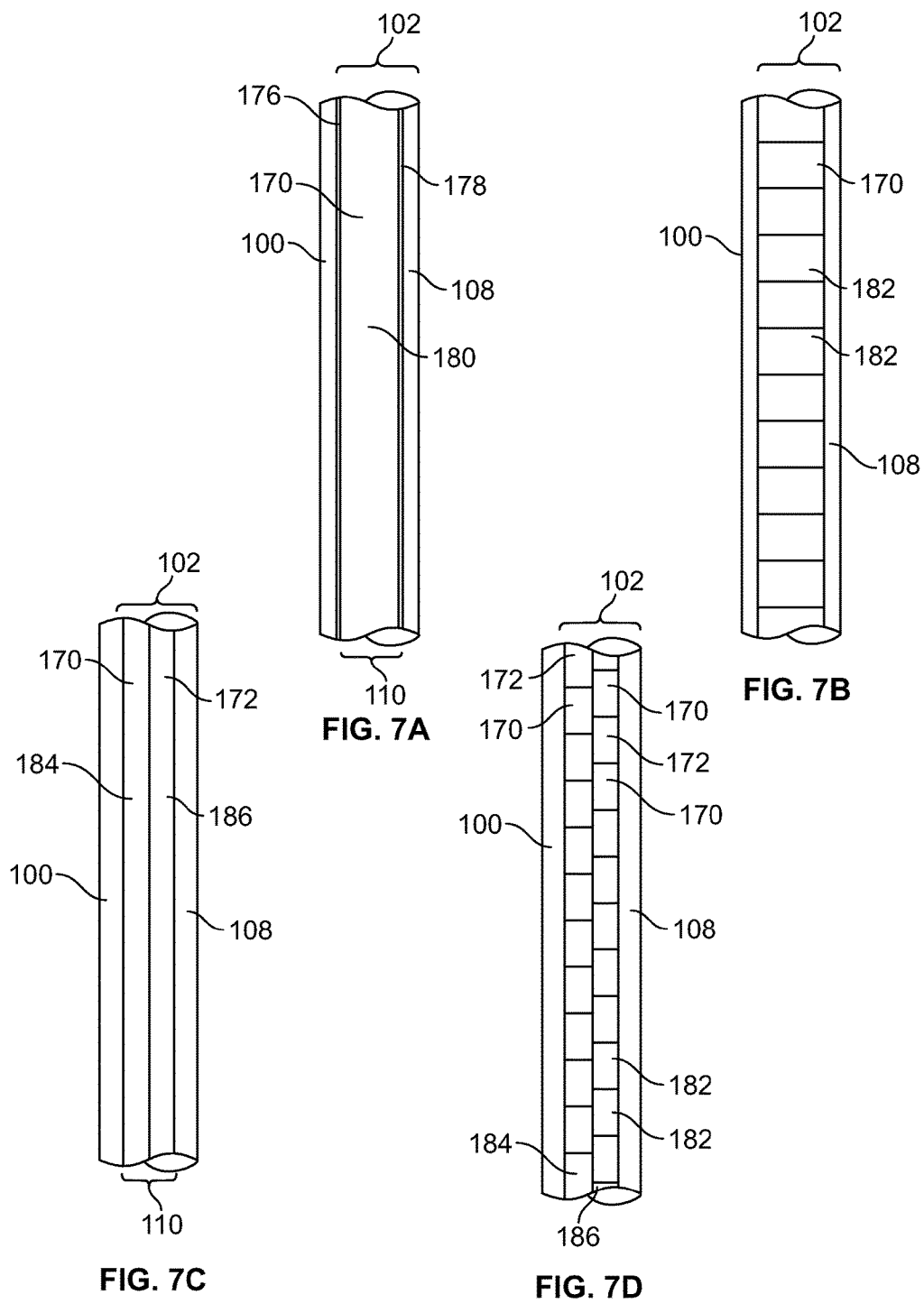

SELF-SEALING LIQUID BLADDERS

BACKGROUND OF THE INVENTION (1) Field of the Invention

This invention relates to liquid containing bladders that include a plurality of material layers including a liquid impermeable material layer and at least one sealing layer, the sealing layer including a sealing means for sealing punctures that penetrate the sealing layer.

(2) Description of the Art

Containers are routinely used to hold hazardous and non-hazardous liquids such as hydrocarbons (fuels such as gasoline and kerosene, LPG, crude oil, petrochemicals and the like), liquid hazardous wastes, aqueous acidic and caustic materials, industrial feedstocks, foodstuffs such as milk and oils, and a wide variety of additional liquid materials. Such containers often include inert material bladders inside the container to contain the liquid and to prevent the liquid from contacting the container walls which might be liquid permeable or which might react with the liquid held in the container. The liquid bladders also ensure that leaks are prevented in the event the outer container is breached by a perforation, by corrosion or by any other mechanism.

Liquid holding containers that include bladders can be perforated in such a way that both the container and the bladder are perforated in which case the liquid in the bladder is able to leak out of the bladder and the container through the hole or wound. Some containers employ features to minimize liquid leakage in the event a container is damaged. Minimizing liquid leakage can be especially important with fuel holding containers such as fuel tanks where holes or wounds can allow fuel leakage that can swiftly reduce the amount of fuel available to power the vehicle. Such fuel leaks can result in a financial loss of valuable fuel, in environmental contamination, in a risk of fire, or in a total vehicle loss.

Military vehicles (e.g., military aircraft, tanks, trucks and the like) are especially vulnerable to fuel tank damage such as damage during combat as a result of being hit by ballistics, small arms fire, projectile weapons, shrapnel and/ or other similar devices. Such damage can include holes, wounds, punctures, tears, piercings, perforations etc. in the vehicle, with those affecting the fuel tank being particularly problematic. Accordingly, many vehicles, military or otherwise, utilize self-sealing fuel tanks to minimize such risks when the fuel tank is perforated. Conventional self-sealing fuel tanks use a thick layer of natural rubber in the center of a bladder wall. When the tank and self-sealing bladder are punctured, fuel from the tank interacts with the natural rubber of the bladder and causes the rubber to swell to an extent that the hole is effectively sealed, thereby preventing further fuel leakage. However, the natural rubber can take a significant amount of time (e.g., 2 minutes or more) to swell sufficiently to seal the puncture. In addition, larger caliber penetrations are not easily sealed by natural rubber sealants. Furthermore, conventional self-sealing fuel tank bladders can be stiff, heavy, and difficult and expensive to install. Therefore, there is need for improved self-sealing liquid bladders.

SUMMARY OF THE INVENTION

The presently disclosed self-sealing liquid bladders may be used as is or they may be used in conjunction with a fluid holding container in order to reduce and/or essentially stop fluid leaks caused by damage (e.g., a perforation) to the bladder/container. For example, the self-sealing bladders may be placed within a fuel tank to automatically reduce the size of and/or essentially seal fuel tank holes or wounds. The self-sealing effect may be rapid in some examples, may be capable of sealing larger caliber penetrations than are conventional self-sealing bladders, may be lighter and easier to install than conventional self-sealing bladders, and/or may be more flexible than conventional self-sealing bladders.

In one aspect, the self-sealing liquid bladder includes a liquid bladder having a plurality of layers including a liquid impermeable material layer that is compatible with a liquid held in the bladder and at least one sealing layer that is conformally arranged to span a surface area of the liquid impermeable material layer and that is separated from a liquid held in the bladder by the liquid impermeable layer wherein the sealing layer includes a plurality of shape changing structures that change geometry when exposed to the liquid in the bladder.

In another aspect, the self-sealing liquid bladder includes a liquid bladder having a plurality of layers including a liquid impermeable material layer that is compatible with a liquid held in the bladder, and at least one sealing layer that is conformally arranged to span a surface area of the liquid impermeable material layer and that is separated from a liquid held in the bladder by the liquid impermeable layer wherein the sealing layer includes at least one compressed material that is retained in the sealing layer in a compressed state until a hole is formed in the liquid bladder at which time the compressed material adjacent to the hole expands to at least partially plug the hole.

In yet another aspect, the self-sealing liquid bladders include a liquid bladder having an at least one sealing layer that is conformally arranged to span a surface area of the bladder and that is separated from a liquid held in the bladder by a liquid impermeable layer wherein the at least one sealing layer is at least one segmented cellular structure layer that includes a plurality of cells defined by one or more partition walls wherein at least one bladder sealing material is retained within each of a plurality of the cells.

In a further aspect, the self-sealing liquid bladder includes a bladder having a plurality of layers including a liquid impermeable material layer that is compatible with a liquid held in the bladder, and at least one sealing layer that is conformally arranged to span a surface area of the liquid impermeable material layer and that is separated from a liquid held in the bladder by the liquid impermeable layer wherein the sealing layer includes at least one sealant encapsulating structure.

BRIEF DESCRIPTION OF THE DRAWINGS

FIG. 1 is a schematic representation illustrative of a container for holding a fluid that includes a self-sealing bladder according to the present disclosure;

FIG. 2A, FIG. 2B and FIG. 2C are schematic representations of a cross-section of a container and bladder in which the bladder sealing layer includes a plurality of shape changing fiber structures and where the figures illustrate the reaction of the shape changing fibers to a bladder penetration;

FIG. 7A, FIG. 7B, FIG. 7C and FIG. 7D are schematic representations of a cross-section of a container and bladder in which the bladder sealing layer includes one or more unreacted sealant containing cells.

DESCRIPTION OF CURRENT EMBODIMENTS

Figure 3A:
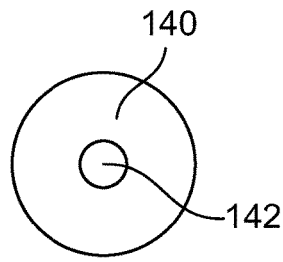
FIG. 3A, FIG. 3B, FIG. 3C and FIG. 3D are cross-sectional representations of fibrous shaped materials including a first bladder fluid absorbent material (140) and a second material (142) that does not substantially expand upon contact with the bladder liquid.

Self-sealing bladders and related methods are disclosed herein. The self-sealing bladders may be used to reduce loss of a fluid from a container when the container is perforated by a hole or a wound. Presently disclosed self-sealing bladders may provide faster plugging/sealing of wounds or holes in bladder walls caused by penetrating objects in comparison to prior art self-sealing tanks, may be able to seal larger wounds than prior art self-sealing tanks, may be easier to install than prior art devices, may be more flexible than prior art devices, may be lighter than prior art devices, may have a thinner bladder wall than prior art devices, and/or may enable the cavity or container in which the self-sealing bladder is placed to hold more fuel than prior art devices.

Self-sealing bladders that are described herein have a multitude of possible uses. The self-sealing bladders may be used in bladder holding containers of any sort including but not limited to bladders that are used to store, transport, provide etc. hazardous and non-hazardous liquids such as; hydrocarbons, including but not limited to fuels such as gasoline and kerosene, LPG, crude oil, petrochemicals and the like; liquid hazardous wastes; aqueous acidic and caustic liquids, industrial feedstocks; water; foodstuffs such as milk and oils, and a wide variety of additional liquid materials.

Self-sealing bladders may be used in conjunction with containers including, but not limited to drums, barrels, storage tanks, fuel tanks, tanker trucks, railroad tank cars, liquid storage and liquid feed vessels and any similar containers. Self-sealing bladders may be particularly useful in conjunction with containers in the form of fuel tanks and in particular aircraft fuel tanks and/or military vehicle fuel tanks because these types of fuel tanks are prone to perforation by military ordinance and/or because fuel loss from these types of fuel containers can have catastrophic consequences. However, the self-sealing bladders can be equally useful in conjunction with conventional fuel tanks such as those found in watercraft, land vehicles, spacecraft, automobiles, motorcycles, trucks, construction equipment, buses, and other like fuel propelled vehicles.

Self-sealing bladders can be used in association with containers and tanks having a wide range of volumes. For example, the bladders can have a liquid volume of as little as 1 L or as great as 100,000 L or even much larger. For very large tanks and containers, multiple bladders can be placed in a container and interconnected with conduits to provide the necessary fluid volume.

Turning now to FIG. 1 there is shown a schematic of a container (100) including a self-sealing bladder (102). Container (100) includes an outside surface (104) and an opposing inside surface (106). Self-sealing bladder (102) includes a liquid impermeable layer (108) that is compatible with (inert to) the liquid held in the bladder. Self-sealing bladder (102) further includes at least one sealing layer (110) that is conformally arranged to span a surface area of the liquid impermeable material layer and that is separated from a liquid held in the bladder by liquid impermeable layer (108). The combination of liquid impermeable layer (108) and sealing layer (110) can form one or more spaces (112) in which sealing means (114) may be located. Alternatively, a sealing means (114) can be incorporated into sealing layer (110).

Container (100) will define a volume (116) which can be occupied by the fluid filled self-sealing bladder (102). Container (100) will typically include one or more openings (118) though which a conduit (120) associated with self-sealing bladder (102) can pass. The conduit (120) may be used to direct liquid (122) into or out of self-sealing bladder (102). Multiple conduits can be associated with self-sealing bladder (102) where, for example, one conduit can be used to direct liquid (122) into self-sealing bladder (102) and another separate conduit can be used to withdraw liquid (122) from self-sealing bladder (102).

Sealing layer (110) will include one or more sealing means that provides a bladder with substantial sealing protection. The term "substantial sealing protection" refers to a sealing means that is capable of covering at least 50% of the bladder inner surface, more preferably at least 90% of the bladder inner surface and even more preferably at least 99% of the bladder inner surface. The sealing means may further be arranged in sealing layer (110) to at least partially seal a bladder hole or wound. The term "partially seal" means that the sealing means can reduce unwanted fluid flow thought a bladder hole or wound by at least 50% by volume. In another aspect, the sealing means can be arranged to "substantially seal" a bladder hole or wound in which case it would reduce the amount of fluid flowing from a bladder hole or wound by at least 90% by volume.

In one aspect of this invention, the sealing means may be a plurality of shaped structures that change geometry when exposed to the liquid held in the bladder. The shape changing structures can take on any form such as spheres, squares, rectangular columns, fibers, powders, amorphous particles or structures and so forth. Importantly, the shape changing structures change their geometry when exposed to the liquid held in the bladder. The term "change geometry" as used herein includes changes in the size of the shape changing structures, changes in the orientation of the shape changing structures, changes in the length or cross-section of the shape changing structures and other similar geometric changes.

The change in geometry of the shape changing structures is typically caused by the shape changing structures absorbing the bladder liquid. In this aspect, the shape changing structures will include at least a first material that expands upon contact with the liquid in the bladder. In this aspect, the shaped changing structures can include a second material that is either inert to the liquid in the bladder or that absorbs liquid in the bladder to a greater or lesser extent than the first material only at a slower absorption rate than the first material. In this aspect, as the shape changing structure absorbs liquid from the bladder, the structure twists, bends and/or rotates due to the different bladder liquid absorption rates to the shape changing structure first material and second material.

In another aspect, the entire shape changing structure can be made of a first material that expands upon contact with the liquid in the bladder.

Referring now to FIG. 2A, 2B and 2C, there are shown side views of a container (100) including a self-sealing bladder having a liquid impermeable layer (108) and two sealing layers (110). In FIG. 2B, the container and bladder have been perforated to create a hole (130) through which the liquid in the bladder can escape. Sealing layer (110) includes a plurality of shape changing fibers (132) that at least partially bridge hole (130). In FIG. 2C, fibers (132) have absorbed liquid held in the bladder and have changed geometry by expanding as a result of the liquid absorption to form a plug (133) that at least partially fills hole (130). The expansion of the size of the fibers due to the liquid absorption constitutes a change in geometry of the fibrous shape changing structures. In one aspect of this invention, the first and/or second material that expands upon contact to form the plug can further harden or cure by being exposed to air or to the bladder fluid to form a semi-permanent or permanent sealed hole.

Fibrous shape changing structures can be especially useful because the can remain attached to an intact portion (134) of sealing layer (110) following perforation of the container. Shape changing structures that can easily disengage from sealing layer (110) can enter the fluid in the bladder and subsequently travel with liquid being removed from the bladder. Therefore, in some instances precautions may need to be taken to ensure that shape changing structures are prevented from entering into engines that operate on fuel withdrawn from container (100). For example, where the shape changing structures are not fibrous, e.g., a plurality of spheres, cubes, pyramids and the like, the individual shape changing structures can be connected to one or more adjacent shape changing structures by threads or adhesives for example and/or the shape changing structures can be secured in sealing layer (110) in small porous and expandable sacks or nets. In another precaution, shown in FIG. 2C, fibers (135) that are non-absorbent—that are essentially inert to the liquid in the bladder are included in sealing layer (110). Including inert fibers (135) in sealing layer (110) can provide some structural integrity to the shape changing structures as they absorb liquid in the bladder to seal a bladder hole.

The shape changing structures can be homogeneous in that they can be manufactured entirely from a first material that absorbs the fluid held in the bladder. Alternatively, the shape changing structures can be heterogeneous and be manufactured from two or more materials—the first material, a second material and optional additional materials—wherein the two or more materials are not admixed and where at least the first material absorbs fluid in the bladder and expands upon such absorption.

Figure 3B:
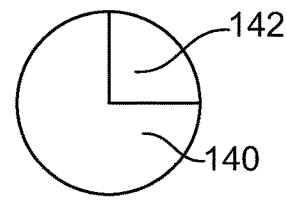
Figure 3C:
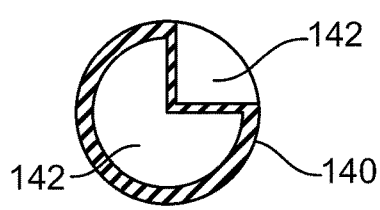
Figure 3D:
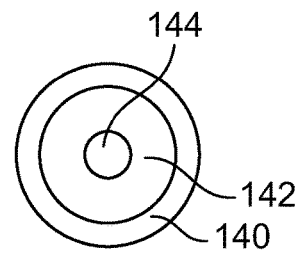

Referring now to FIGS. 3A-3D and 4A-4F there are shown cross-sections and/or views of fibrous shaped materials including at least a first fluid absorbent material (140) and, in some cases a second material (142) that does not substantially expand upon contact with the bladder liquid, i.e., it is either not fluid absorbent or it absorbs fluid in the bladder at a slower rate that the first fluid absorbent material. FIG. 3A is a cross-section of a shape changing structure such as a fiber or sphere that includes a first fluid absorbent material (140) that encapsulates or surrounds the second material (142). A similar shape changing structure is shown in FIGS. 3B and 3C. In FIG. 3B, the first fluid absorbent material (140) lies adjacent to the second material (142). In FIG. 3C, the shape changing structure includes a first fluid absorbent material (140) that surrounds (encapsulates) a second material portion (142') and that further includes a second material portion (142") that is coterminous with the first fluid absorbent material (140). In FIG. 3D, the shape changing structure includes concentric layers of a first fluid absorbent material (140), a second material (142) and a third material (144) that can either be fluid absorbent or non-fluid absorbent.

In each of FIGS. 3A-3D—when the shape changing structure is a fiber—the first fluid absorbent material (140) is coterminous with second material (142). Several possible advantages arise from orienting first fluid absorbent material (140) coterminous with second material (142). One possible advantage is that second material (142) provides the shaped material with some structural integrity thereby preventing the shaped material from falling apart should the first fluid absorbent material (140) soften upon absorbing fluid from the bladder. A second possible advantage is that differential expansions of the two materials cause the shaped materials to distort and/or bend and intertwine to, in the case of fibrous shaped materials, to form a ball as the first fluid absorbent material (140) absorbs fluid from the bladder thereby enhancing the sealing of a bladder hole.

Figure 4A:
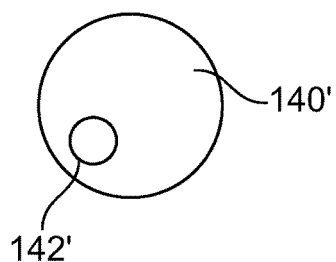
FIGS. 4A-4E are views of fibrous shaped materials including a first bladder fluid absorbent material (140) and a second material (142) where the figures are illustrative of the fibrous materials before and after absorbing bladder fluids.
Figure 4B:
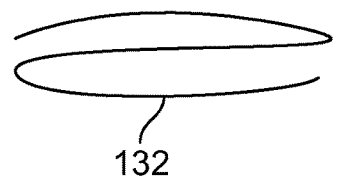
Figure 4C:
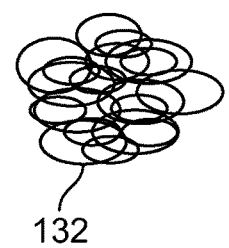

FIGS. 4A and 4B are an end cutaway view and a schematic view respectively of a shape changing fiber structure including a second material (142) surrounded by, linearly coterminous with, but not concentric with a first fluid absorbent material (140). FIGS. 4B and 4C show the structure of FIG. 4A before (FIG. 4B) and after (FIG. 4C) the first fluid absorbent material (140) of the shape changing fiber structure has been exposed to and has absorbed fluid held in the bladder. In FIG. 4C the space occupied by the shape changing fiber structure is greatly expanded and the schematic view of the shape changing fiber structure in FIG. 4C shows that the fiber has also geometrically changed to form a dense plug of material.

Figure 4D:
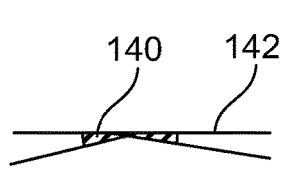
Figure 4E:
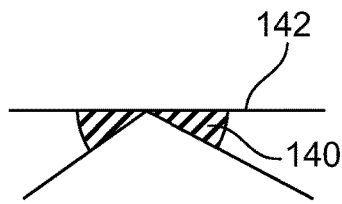

FIGS. 4D and 4E are cross-section views of yet another shape changing fiber structure embodiment before (FIG. 4D) and after (FIG. 4E) the shape changing fiber structure is exposed to a bladder fluid. The shape changing structure of FIGS. 4D and 4E includes first fluid absorbent material (140) and second material (142). The first fluid absorbent material (140) is positioned at the intersections of the second material. When the first absorbent material (140) absorbs fluid held in the bladder, the expansion of the first absorbent material (140) drives the second material pieces apart and causes the shape changing structure to expand geometrically to occupy a larger space.

In this and other aspects, the shape changing structures not only grow volumetrically larger in an amount essentially equal to the volume of bladder fluid absorbed, but they can grow spatially larger in that they occupy a volume that is greater than the volume of the original shape changing structure plus the volume of liquid absorbed by the shape changing structure. By growing volumetrically and/or spatially, the plurality of expanded shape changing structures are able to at least partially seal and alternatively substantially seal a bladder hole. The plurality of shape changing structures may be positioned in in sealing layer (110) in any manner that allows the shape changing structures to be exposed to liquid in the bladder when a hole is formed in the bladder. Generally, sealing layer (110) will include at least one layer of packed shape changing structures. Alternatively, sealing layer (110) may include two or more layers of packed shape changing structures wherein an optional divider may be located between each shape changing structure layer.

First fluid absorbent material (140) may be any material that absorbs fluid held in the bladder. In one aspect of the invention, the fluid absorbent material should be absorbent enough so that it expands by at least 50% in volume upon absorption of the bladder fluid. In other aspects, the fluid absorbent material should be selected from a material that expands by at least 100% or alternatively by at least 200% upon absorption of the bladder fluid. In one aspect, the first fluid absorbent material can be a fiber having a plurality of capillaries or channels into which fluid is drawn upon contact with bladder fluid.

When the bladder fluid is an aqueous fluid, then the first fluid absorbent material can be, for example, chosen from aqueous or hydrocarbon absorbent materials such as; hydrocarbon encapsulated polymers including but not limited to polyvinyl pyrrolidone, (hydroxyethyl)methacrylate, and polymers with polyacrylate backbones; plant fibers; natural and synthetic elastomers such as ethylene propylene diene monomer (EPDM); natural and synthetic rubbers; super absorbent polymers (SAP) such as an acrylic acid and sodium acrylate copolymer; polyolefins; hydrogels; and any other materials that absorb hydrocarbons and or aqueous fluids and that swell or expand upon fluid absorption.

Useful second materials can be any material that does not absorb or one or more that absorbs the bladder fluid. Therefore, the second material can be selected from the same materials as the first material so long as the fluid absorption rates of the first and second materials are not the same. Examples of useful second materials that do not absorb fluid in the bladder include, but are not limited to threads made of polymers, metal wires, plastic or metal sheet materials, fabrics, fiberglass and combinations thereof.

In another aspect of this invention, the sealing means may be one or more compressed materials. In this aspect, sealing layer (110) may comprise one or more compressed materials or alternatively, the one or more compressed materials may be located in a space formed between liquid impermeable layer (108) and sealing layer (110). The compressed materials may be held in a single layer, or two or more layers of compressed materials may be combined to form sealing layer (110). When two or more layers of compressed materials are used, the layers may be separated by a divider that is impermeable or alternatively that is permeable to liquid in the bladder.

The one or more compressed materials may be any material that can be compressed to store potential energy. When the bladder and sealing layer is penetrated to form a hole, sealing layer in the vicinity of the compressed material(s) is compromised which in turn releases the potential energy of the compressed materials in the area of the hole and the compressed material(s) expand to plug the hole formed by the penetration. Alternatively, the compressed material potential energy can be released by contacting the compressed material with a liquid in the bladder to plug the penetration hole.

The compressed material may be selected from any material that is capable of expanding and filling a bladder penetration hole. Non-limiting examples of compressed materials include fibers, open cell foams, closed cell foams, fabrics, non-wovens, felts sponges and combinations thereof. When the compressed material is a fiber, the fibers may be kinked fibers, coiled fibers, asymmetric expanding fibers, hollow fibers, non-uniform fibers, non-circular fibers, continuous fibers, discontinuous fibers and combinations thereof. The compressed fiber material can be a plurality of individual intertwined fibers or it can be chopped fibers that are compressed to form shapes such as sheets, discs, mats and any other compressible shape that may be useful to seal a bladder puncture. The plurality of fibers can have uniform properties such as stiffness, tensile strength, length, diameter, cross-sectional area and the like or the individual fiber properties can differ within the same or different compressed material structure. In addition, the compressed material(s) may be single or multi-component fibers including a first bladder fluid inert or absorbent material (140) and an optional second bladder fluid inert or absorbent material (142).

In some instances it may be desirable for the compressed material to expand only upon contact with bladder fluid. In this instance, the compressed materials can be bound with, impregnated with or otherwise held in a compressed state by a bladder fluid reactive material. A bladder fluid reactive material may be a material that reacts with fluid in the bladder or one that is dissolved by the liquid in the bladder. The bladder fluid reactive material should be capable of maintaining the compressed material in a compressed state prior to contact with the bladder fluid. However, upon contact with bladder fluid, the bladder fluid reactive material should release its hold on the compressed material thereby allowing the compressed material to expand. In some instances, the bladder fluid reactive material may provide the further function of reacting with the fluid in the bladder or with another material present in sealing layer (110) to form a reaction product that is capable of operating in unison with the released compressible material to plug a bladder perforation.

Figure 5A:
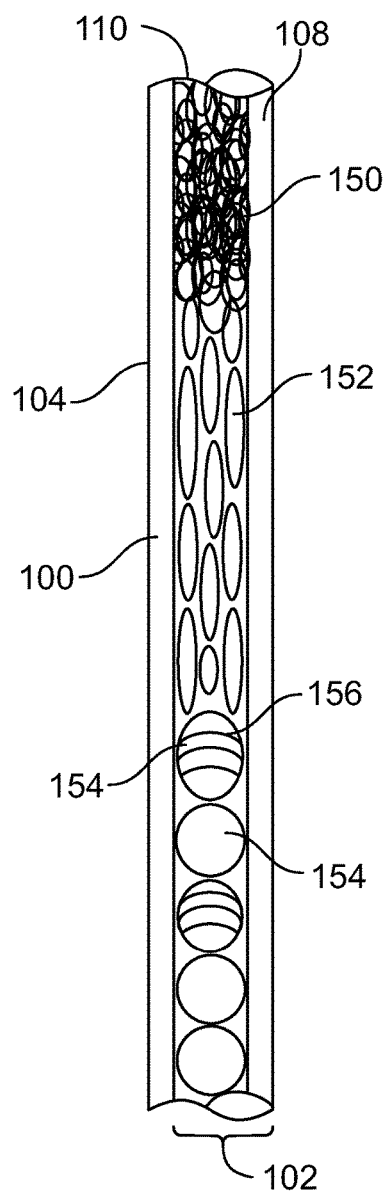
FIG. 5A and FIG. 5B are schematic representations of a cross-section of a container and bladder in which the bladder sealing layer includes a compressible material and wherein the figures illustrate the reaction of the compressible material to a bladder penetration.
Figure 5B:
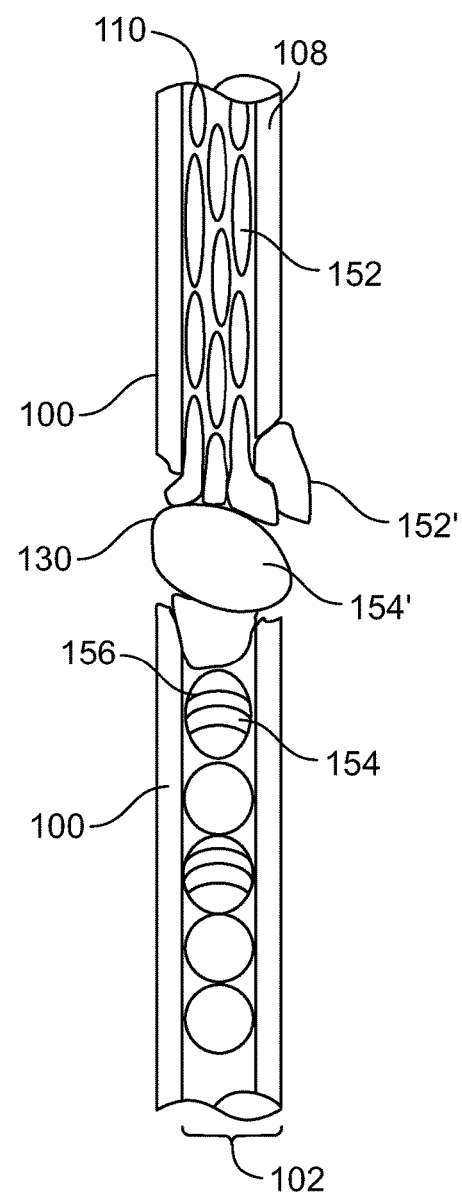

Referring now to FIGS. 5A and 5B, there is shown cross sections of a container including a bladder where the container and bladder are intact (FIG. 5A) and were the container and bladder have been perforated and the perforation plugged with compressible materials (FIG. 5B). Inside container (100) is a liquid impermeable layer (108). Sandwiched between container (100) and liquid impermeable layer (108) is sealing layer (110). In FIG. 5A, sealing layer (110) includes a variety of compressed material forms (150, 152 and 154). These forms are exemplary and non-limiting and the compressed materials may take on any other useful form or shape.

Compressed materials (152) are disk shaped compressed materials that may be, for example, chopped fibers, foam, sponges and so forth. When compressed material is a compressed fiber material, the fiber may be a single length of fiber in compressed form or it may be a plurality of fibers that are interwoven or non-interwoven that together form the compressed material. The disk shaped compressed materials can form a single layer or they can be oriented in any manner such as adjacent to one another or randomly to form multiple layers of compressed material discs. Compressed materials (154) are spherical shaped compressed materials. Some of the spherical compressed materials shown include a sheath (156) of bladder fluid reactive material that retains the compressed material in a compressed form. Sheath (156) may be a continuous sheath, it may be an intermittent sheath, it may be stitching, it may be an impregnating material that holds the compressed material in a compressed state or it may be any combination thereof.

In FIG. 5B, container (100) and bladder (102) include perforation (130). Perforation (130) also perforates sealing layer (108) thereby both releasing the compressed materials from their compressed state in the vicinity of perforation (130); and exposing the compressed materials to the bladder fluid. The compressed materials that are not sheathed (152') expand quickly to at least partially fill perforation (130). The sheathed compressed materials contact the bladder liquid which reacts with, dissolves or otherwise destroys the integrity of sheath (156) thereby allowing the compressed materials (154') to decompress and expand into perforation (130).

The at least one compressible material may alternatively be compressed spring-like materials. The compressed spring-like material may be individually compressed spring structures or they may be spring-like structures that are associated with one or more additional materials that work together with the springs to plug bladder perforations.

The compressible material(s) can be oriented to expand in two or three dimensions. When expanding in three dimensions, the material comprising a compressed material can be randomly positioned within the compressed material or a plurality of compressed materials can be randomly positioned in sealing layer (110) of bladder (102). Alternatively the compressed material can be positioned in sealing layer (110) in a non-random or orderly manner so that the compressed material expands in a predetermined direction.

In another aspect the sealing layer can include a plurality of compartments or cells where each cell includes one or more compressed materials or compressed material forms. Placing compressed materials in compartments limits the migration of fluid from the bladder into sealing layer (110) when one or more of the compartments are breached by a hole in the bladder. The size of the cells will be determined by the potential size of the bladder perforation. Generally the cells will have a width or diameter of from about 1 inch to about 6 inches.

In another aspect of this invention, the sealing means is a sealing layer having a segmented or cellular structure where each cell is arranged to contain at least one bladder hole sealing material. When the bladder is perforated and a hole is formed, only one or a small number of cells will be disrupted as a result of the perforation and the sealing material in the disrupted cells will be made available to plug the bladder hole. Using a cellular structure limits the amount of sealing material that is exposed to liquid in the bladder thereby allowing for the use of more aggressive sealing materials and preventing liquid in the bladder from migrating throughout the bladder sealing layer.

Figure 6A:
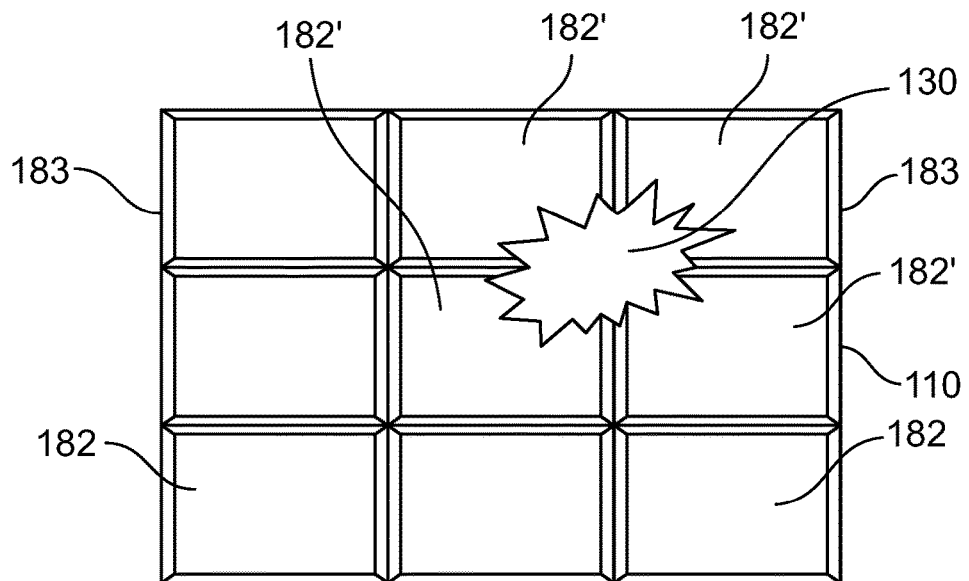
FIG. 6A, FIG. 6B and FIG. 6C are schematic representations of a front view and cross-sections respectively of a bladder sealing layer having a segmented cellular structure.
Figure 6B:
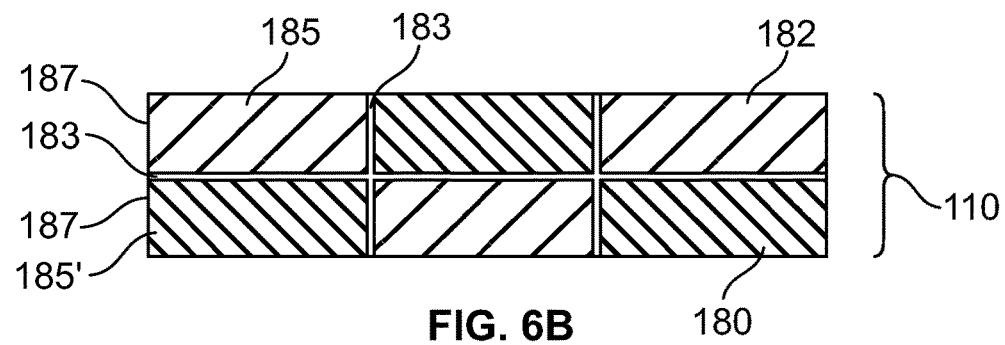
Figure 6C:
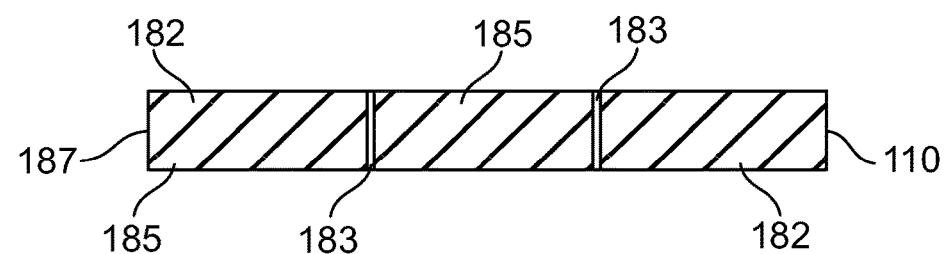

FIGS. 6A-6C are schematic representations of a front view and cross-sections respectively of a bladder sealing layer having a segmented cellular structure. A bladder sealing layer (110) is shown which includes a plurality of cells (182) where each cell is defined by one or more partition walls (183). A single partition wall would be necessary where the cells are attached spheres. However, cells that are square, rectangular, triangular and so forth would have multiple partition walls.

Each of the cells (182) will contain a bladder sealing material (185). The bladder sealing material may be any of the sealing material aspects discussed above or below. The plurality of cells (182) may all hold the same bladder sealing material (185). Alternatively, as is shown in FIG. 6B, the cells may hold different bladder sealing materials (185 and 185').

The sealing layer (110) may include a plurality of cells forming a segmented cellular structure as is shown in FIG. 6C. Alternatively, sealing layer (110) may include two or more layers (187) of segmented cells as is shown in FIG. 6B. When two or more layers of segmented cells are used, the cell partition walls of cells in adjacent layers can line along the same line with or be offset from the partition walls of adjacent cells of an adjacent segmented cellular structure layer.

FIG. 6A shows a segmented cellular structure including a hole (130) that disrupts the integrity of four cells (182') of the segmented cellular structure. Hole (130) would expose only the bladder sealing material in the disrupted cells (182') to the fluid held in the bladder and the exposed sealing material would participate in sealing hole (130). The remaining undisrupted cells (182) would not be exposed to the fluid held in the bladder and the bladder sealing material thereby limiting the sealing response to a small area of the segmented cellular structure.

When sealing layer (110) is a segmented cellular structure, the size and shape of the cells can be tailored to maximize the sealing effectiveness of the chosen bladder sealing material. In addition, the size of the cells of the segmented cellular structure will vary depending upon one or more of the chosen bladder sealing material, the anticipated size and type of bladder punctures and holes to be sealed, the sealing material mechanism as well as other factors.

In a similar aspect, the sealing means may be a sealing layer including one or more sealant encapsulating structures each arranged to hold a volume of at least one unreacted sealant. The term "sealant encapsulating structure" refers to one or more bladder layers, each layer containing an unreacted sealant or a plurality of cells in a single sealing layer. The term "unreacted sealant" refers to a material or materials that are capable of reacting to seal a bladder penetration. The unreacted sealant can be a single component sealant or a two-part sealant. The sealant may be selected from materials that react with the fluid in the bladder, from materials that react with air, oxygen or any other gas or liquid that the sealant is expected to be exposed to should the bladder be perforated. For example, the sealant may be one or more of a gum-based material, ethylene glycol, propylene glycol, polyethylene glycol, polyvinyl alcohol, hydroxyethyl cellulose, urethane, plasticized urethane, silicone, fluorosilicone, water, nitrile rubber, polybutadiene, polyester urethane, rubber, synthetic rubber, fluorosilicone rubber, fluorocarbon rubber, styrene butadiene, perfluorocarbon rubber, silicone-based rubbers, polysulfide, and/or any other material having suitable properties for the practical application of a self-sealing bladder. A sealant may be selected based on its ability to "set," (e.g., cure, react, solidify, and/or harden), when exposed to various substances such as air, oxygen, one or more additional sealant materials or the bladder fluid. Examples of two part sealant systems include combinations of the sealants listed above, two part urethanes, two part epoxy systems, two part foams, two part polysulfide, two part silicone and other similar two part sealant systems.

The sealant should be a material(s) that forms a seal that is essentially inert to the bladder liquid. Additionally, the viscosity of the sealant can be adjusted to ensure that it flows upon breach of the bladder sealing layer. Alternatively, the bladder sealing layer or individual sealing cells can be slightly pressurized so that sealant will be driven by pressure from the ceiling layer should the bladder be perforated.

In some aspects, the unreacted sealant may be a fluid absorbent material such as fluid absorbent spheres, fibers, pastes, powders, granules and so forth where the fluid absorbent material expands upon absorbing bladder fluid.

Referring now to FIGS. 7A-7D wherein there are shown side cutaway views of containers including bladders having at least one cell containing a volume of unreacted sealant. FIG. 7A shows a container (100) including the bladder liquid impermeable layer (108) and a sealing layer (110) positioned between container (100) and impermeable layer (108). Sealing layer (110) includes a first wall (176) and a second wall (178) the combination of walls defining a cavity containing a first sealant (170) that alone will respond to the bladder perforation by forming a seal. In FIG. 7A, first wall (178) and bladder liquid impermeable layer (108) may be the same wall/layer.

FIG. 7B is a container (100) including a bladder (102) having a sealing layer that includes a plurality of cells (182) each holding a volume of first sealant (170). Perforation of bladder (102) will disrupt one or more cells (182) causing the first sealant (170) in the disrupted cells to migrate towards the perforation and form a plug. The container shown in FIG. 7B can also be used for two-part sealing systems where a first cell holds first sealant (170) and one or more adjacent cells holds a second sealant. In this aspect, the two-part sealant system can be arranged in a checkerboard pattern of cells (182) in sealing layer (110).

FIGS. 7C and 7D show possible orientations of one or two-part sealants in sealing layer (110). In FIG. 7C, sealing layer (110) includes two adjacent planar partition chambers (184) and (186) which respectively hold first sealant (170) and second sealant (172). In this aspect, a bladder perforation disrupts the partition chambers and allows first and second sealants to flow into the perforation until the hole is plugged.

The bladder (102) in FIG. 7D also includes adjacent partition chambers (184) and (186). However, each of the partition chambers (184) and (186) include a plurality of cells (182) where each cell holds either a first sealant (170) or a second sealant (172). In this aspect, it is preferred that latterly adjacent cells hold different sealants—as in a checkerboard. In addition, cells in adjacent chambers may hold different sealants. Alternating first sealant and second sealant in adjacent cells is intended to make it highly likely that a bladder perforation will disrupt the integrity of cells holding both first and second sealants thereby ensuring that the first and second sealants contact each other so that they can react and form a perforation plug.

Cells (182) can be manufactured of a material that is easily disrupted by perforation. Alternatively, cells (182) can be made partially or totally of a material that is soluble in the bladder fluid in which case exposure of to the bladder fluid will solubilize at least part of the cell wall to liberate solvent held therein.

Figure 8A:
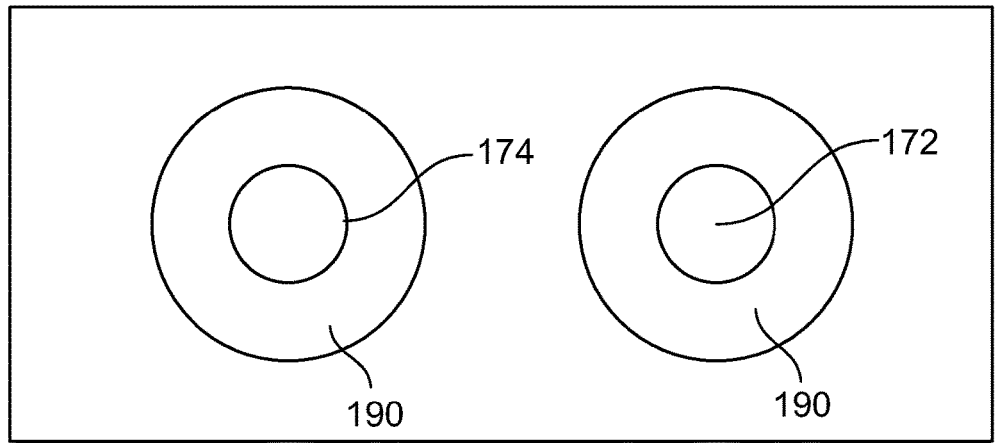
FIG. 8A and FIG. 8B are schematic representations of sealant filled cells.
Figure 8B:
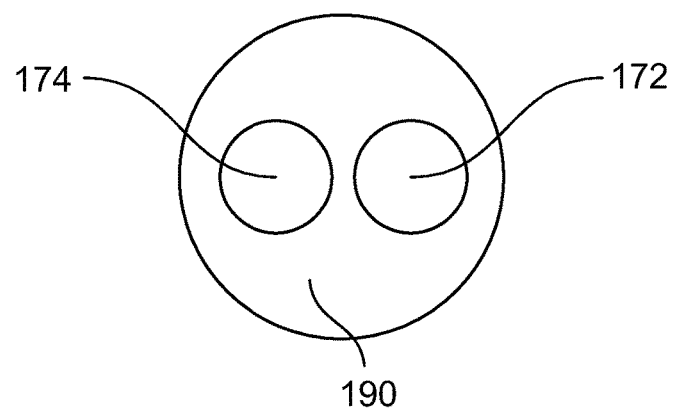

A sealant may also be located in sealing layer (110) as a sealant filled article such as sealant filled fibers, sealant filled spheres, sealant filled cubes and other similar sealant filled articles. A quantity of the sealant filled articles can be packed into sealing layer (110). FIGS. 8A and 8B are examples of such sealant filled articles. FIG. 8A are cross-sections of a first fiber including a first sealant (172) surrounded by a protective layer (190) and a second fiber including a second sealant (174) and also having a protective layer (190). In a one sealant system, only fibers containing one of sealants will be located in sealing layer (110). In a two-part sealant system, both fiber types will be placed in sealing layer (110). In a similar manner, sealant can be held in three-dimensional structures of any shape such as spheres, pyramids, diamonds, columns, cubes, cylinders and so forth. FIG. 8B is a cross-section of a fiber that includes a cavity holding first sealant (172) and a separate cavity holding second sealant (174). Both cavities are surrounded by protective layer (190).

The sealant filled fibers can be placed in sealing layer (110) in a random manner or in an orderly manner. In an orderly manner, the fibers can be formed into mats, cloths, oriented in alternating X and Y directions and so forth. Protective layer (190) may be made of a material that breaks easily upon perforation of the bladder to liberate solvent. Alternatively, protective layer (190) may be made of a material that is soluble in the bladder fluid in which case exposure of the fiber to the bladder fluid will solubilize protective layer (190) and liberate the internal solvent.

The sealing means aspects discussed above may be capable of partially or essentially totally plugging holes, wounds, perforations and the like formed in liquid containing bladders by objects such as shrapnel, bullets, rocks, metal debris or any other objects that are capable of penetrating a bladder filled container. The size of the wounds that may be partially or essentially totally plugged can range from microscopic holes to holes as much as 3 inches or more measured across the largest wound gap. The sealing means can at least partially plug a bladder hole meaning that the flow of fluid from inside the wounded bladder to outside of the container is reduced by the action of the sealing means. In addition, a bladder sealing layer may include one or any combination of more than one of the sealing means discussed above.

The foregoing description of the specific embodiments will reveal the general nature of the disclosure so others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

What is claimed is:

1. A self-sealing liquid bladder comprising a liquid bladder having a plurality of layers defining a volume, wherein the layers include a hydrocarbon impermeable material layer that is inert to a liquid hydrocarbon and at least one sealing layer that is conformally arranged to span a surface area of the hydrocarbon impermeable material layer and that is separated from the volume by the hydrocarbon impermeable material layer, wherein the at least one sealing layer includes a plurality of shape changing structures that change geometry upon absorption of the liquid hydrocarbon in the bladder, wherein the plurality of shape changing structures are a plurality of fibers that include a first material that is a liquid hydrocarbon absorbent material capable of expanding upon absorption of the liquid hydrocarbon, wherein the liquid hydrocarbon absorbent material is selected from one or more of hydrocarbon encapsulated polymers, plant fibers, synthetic elastomers, super absorbent polymers, and polyolefins, and wherein the plurality of fibers is capable of expanding as a result of the first material absorbing the liquid hydrocarbon to a size sufficient to at least partially fill a hole in the hydrocarbon impermeable material layer.

2. The self-sealing liquid bladder of claim 1 wherein the plurality of shape changing structures include a second material that does not substantially change geometry upon contact with liquid in the bladder.

3. The self-sealing liquid bladder of claim 2 wherein the shape changing structure first material encapsulates the second material.

4. The self-sealing liquid bladder of claim 2 wherein the shape changing structure first material and the shape changing structure second material are linearly coterminous with one another.

5. The self-sealing liquid bladder of claim 1 wherein the first material expands in volume by greater than 50% upon contact with the liquid hydrocarbon in the bladder.

6. The self-sealing liquid bladder of claim 1 wherein the first material that expands upon absorption of the liquid hydrocarbon in the bladder causes the shape changing structures to assume a shape that occupies more space than the shape changing structures occupied before contacting the liquid hydrocarbon in the bladder.

7. The self-sealing liquid bladder of claim 1 wherein the first material that expands upon absorption of the liquid hydrocarbon in the bladder causes the shape changing structures to grow volumetrically.

8. The self-sealing the liquid hydrocarbon bladder of claim 1 wherein the first material that expands upon absorption of the liquid hydrocarbon in the bladder and the plurality of fibers include a second material that in combination with the first material that expands upon absorption of the liquid hydrocarbon in the bladder causes the shape changing structure to grow spatially.

9. The self-sealing liquid bladder of claim 1 wherein the plurality of fibers include a second material.

10. The self-sealing liquid bladder of claim 9 wherein the first material is coterminous with the second material.

11. The self-sealing liquid bladder of claim 1 wherein the at least one sealing layer includes at least one layer of packed shape changing structures.

12. The self-sealing liquid bladder of claim 11 wherein a divider separates each packed shape changing structure layer.

13. The self-sealing liquid bladder of claim 1 wherein the at least one sealing layer includes two or more layers of packed shape changing structures.

14. The self-sealing liquid bladder of claim 1 wherein the at least one sealing layer includes fibers that do not absorb the liquid hydrocarbon in the bladder.

15. The self-sealing bladder of claim 1 wherein the first material is a hydrocarbon encapsulated polymer selected from polyvinyl pyrrolidone, (hydroxyethyl)methacrylate, and polymers with polyacrylate backbones.

* * * * *